United States Patent [19]

Clark et al.

[11] Patent Number: 4,472,441

[45] Date of Patent: Sep. 18, 1984

[54] PROCESS FOR THE PRODUCTION OF A SOLUBLE TEA PRODUCT

[75] Inventors: Allen V. Clark, Atlanta, Ga.; Francis J. Zientara, Franklin Lakes, N.J.

[73] Assignee: The Coca-Cola Company, Atlanta, Ga.

[21] Appl. No.: 332,798

[22] Filed: Dec. 12, 1981

Related U.S. Application Data

[63] Continuation of Ser. No. 133,675, Mar. 25, 1980, abandoned.

[51] Int. Cl.³ .......................... A23F 3/20; A23F 3/28
[52] U.S. Cl. .................................. 426/387; 426/435; 426/597
[58] Field of Search ...................... 426/597, 435, 387

[56] References Cited

U.S. PATENT DOCUMENTS 3,451,823  6/1969  Mishkin et al. ................. 426/597 X
3,821,440  6/1974  Reeve ............................. 426/597 X

OTHER PUBLICATIONS

Lust, The Herb Book, 1974, Bantam Books: New York, pp. 522, 526.
Eden, Tea, 3rd Ed., 1976, Longman: Great Britain, pp. 3-5.

*Primary Examiner*—Joseph M. Golian
*Attorney, Agent, or Firm*—Eduardo M. Carreras

[57] ABSTRACT

A process and apparatus for preparing soluble tea products capable of being reconstituted in hot or warm water to produce tea beverages substantially free of cloudiness and turbidity, wherein a dilute tea extract obtained from Soviet (Georgian) tea leaf is concentrated, diluted, clarified and reconcentrated. The processing steps according to this invention are generally applicable to the preparation of both hot and cold-water soluble tea beverages from any tea leaf.

7 Claims, No Drawings

PROCESS FOR THE PRODUCTION OF A SOLUBLE TEA PRODUCT

This is a continuation of application Ser. No. 133,675 filed Mar. 25, 1980 now abandoned.

BACKGROUND OF THE INVENTION

The present invention relates generally to tea and, in particular, to a process for making from tea leaves a water soluble product, for example, an extract, concentrate or powder, which is capable of being reconstituted to a tea beverage substantially free of undesirable cloudiness and/or turbidity.

The processing of leaf tea to form a water soluble extract, concentrate or powder which will reconstitute to a tea beverage is, in its general aspects, well known in the art. Thus for example, green or black (fermented) leaf tea is typically extracted with hot water to form a dilute extract containing soluble tea solids. The insoluble leaf material is discarded and the extract is then concentrated to form a concentrated extract which may be sold as is (for example, in frozen, refrigerated or otherwise preserved condition) or dried in an appropriate manner to form a shelf-stable powder.

In the preparation of soluble tea products intended to be reconstituted in cold water and/or consumed cold, much attention has been directed to the elimination of the turbidity or cloudiness which often manifests in the reconstituted beverage. To this end, a wide variety of processes have been proposed to effect the elimination of the cold-water insoluble materials which cause such cloudiness. For example, it has been proposed to employ chemical or enzymatic agents to solubilize the insoluble components; to remove the cold-water insoluble materials or their precursors; or to extract the tea leaf in a manner such that the insoluble materials contributing to or resulting in cloudiness are not leached from the leaf.

The preparation of soluble tea products for reconstitution and consumption in warm or hot water is not generally attended with the difficulties noted with respect to cloudiness and turbidity. Hence, with the exception of a preliminary clarification of the dilute extract resulting from the hot water extraction of tea leaf to remove extraneous undissolved solid portions of the tea or other extraneous materials, it has not been found necessary in commercial processing to conduct elaborate chemical and/or mechanical operations aimed at removing or repressing components which result in cloudiness.

In view of the foregoing, our experience with the processing of both fermented and green Soviet (Georgian S.S.R.) tea to form hot or warm-water reconstitutable tea concentrates and powde was surprising in finding that application of standard processing operations (i.e., extraction, concentration and drying) to this starting tea leaf material resulted in reconstituted beverages which displayed considerable cloudiness and turbidity. Further investigations showed that the dilute extract obtained from extraction of the tea leaf, when clarified, itself showed no turbidity or cloudiness upon dilution with warm water to beverage strength. However, beverages prepared by reconstituting powders obtained by direct spray- or freeze-drying of this dilute, clarified extract displayed excessive cloudiness. The same result appeared in products prepared by reconstituting extracts obtained by concentrating the dilute, clarified extract, and it was noted in these tests that the solids which caused the undesirable cloudiness in the beverage were generated in situ during the concentration process. However, it proved in further testing to be impractical to physically remove the solids from the concentrated extract once they were formed.

As a result of our studies it became apparent that a process other than those typically employed or proposed in removing from tea extracts insoluble or suspended particles and components contributing to cloudiness in the final beverage would have to be developed, since the actual insolubles were present, not after extraction of the tea leaf, but only after in situ formation during further processing of the extract obtained from the leaf.

SUMMARY OF THE INVENTION

According to a particular embodiment of the present invention, a process has been developed which solves the problems encountered in making soluble tea products from Georgian tea leaf. The process results in products which, when reconstituted in hot or warm water, form tea beverages substantially free of undesired cloudiness and turbidity. The process developed comprises the following steps:

(a) contacting Georgian S.S.R. tea leaf with an extraction liquid to extract soluble solids from the leaf and form a dilute extract thereof;

(b) concentrating the dilute extract to form a concentrated extract containing at least about 18% soluble solids by weight;

(c) diluting the concentrated extract by addition of liquid thereto to form an extract containing no more than about 10% soluble solids by weight; and (d) clarifying the extract formed by dilution to remove insoluble components therefrom.

Although the dilute clarified extract formed in the final step of the above process is itself useful for preparing standardstrength tea beverages therefrom, the clarified extract is typically concentrated and dried to form a substantially water-free, shelf-stable powder. Beverages prepared by reconstituting the powder in warm or hot water display highly acceptable clarity and freedom from excessive cloudiness and turbidity. The products are greatly improved over the unacceptable turbid, muddy beverages which result from processing this tea in a conventional manner.

With reference to this particular embodiment of the invention, the Georgian tea leaf is extracted with a suitable extraction liquid, for example, water or a dilute tea extract, typically at a temperature of from about 90° C. to about 100° C. in a suitable apparatus to form a dilute extract generally containing from about 1.5% to about 8.0% soluble solids by weight. The leaf is typically in comminuted form to maximize extraction. In the case of black or green leaf, the prior processing and sorting (by size) which is typically performed in tea growing areas will provide a suitable degree of sub-division without the need for further comminution for practice of the present invention.

The dilute extract obtained may be subjected to clarification, for example, by filtration or centrifugation, to remove any extraneous solid materials from the leaf which might be present. However, as will be apparent from the discussion which follows, the process of the present invention, involving dilution and clarification performed in subsequent phases of the process, albeit for a different reason, makes it possible to eliminate this preliminary clarification.

The dilute extract, be it clarified or that obtained directly from the extraction process, is then concentrated by removal of water therefrom in any appropriate manner, for example, in a multiple-effect evaporator, thin-film evaporator, falling film evaporator and the like.

Our studies on the preparation of extracts from this Soviet tea indicated that the insoluble components which result in cloudiness and turbidity in the final, reconstituted beverages form during the concentration process by an, as yet, unknown mechanism. The first visible appearance of such components appear at a soluble solids concentration of about 12% by weight, with additional formation of such components increasing with increasing concentration. Hence, in order for the subsequent steps of dilution and clarification to be effective in removing a sufficient quantity of these insoluble components to insure an acceptable final beverage from the standpoint of clarity, the concentration must be conducted to a point where the requisite amount of these components are formed or generated. As a practical consideration, although concentration of the extract to any degree above about 12% soluble solids by weight will generate some insolubles and, therefore, permit their removal in subsequent processing, with a corresponding improvement in the clarity of the final beverage, concentration up to at least about 18%, and preferably from about 20% to 25%, soluble solids by weight permits formation, and subsequent removal, of the amount of insoluble components which will insure a commercially acceptable beverage substantially free of cloudiness and turbidity.

Concentration of the dilute extract above this minimum level of 18–25% soluble solids by weight will generally result in a corresponding increase in the insolubles generated and concomitant improvement in the beverage made from an extract from which these components are removed. As can readily be appreciated, however, a practical upper limit exists where the degree of improvement in beverage clarity per increment of increased concentration becomes so slight as not to warrant the expense or difficulties attendant additional water removal and the transport of extracts of increased viscosity. Although this practical upper limit is somewhat arbitrary, depending as it does upon economics and subjective criteria of final beverage clarity, a suitable guideline has been found to be from about 30% to about 50% soluble solids by weight.

The concentrated extract is then diluted with liquid to form an extract having a reduced concentration of soluble solids. Absent practice of this dilution step, removal of the insoluble components generated and present in the concentrated extract has not been practical. The dilution does not result in any significant degree of resolubilization of the formed insoluble components. Rather, the dilution serves, in a manner not fully understood, but believed to be related to viscosity and density, to convert the extract to an appropriate form or state from which the insolubles can be removed. To this end, it has been found necessary to dilute the concentrated extract down to a soluble solids concentration of at least about 10% by weight. Further dilution, for example, down to the range of from about 3% to about 6% soluble solids by weight in fact serves to further facilitate the removal of the undesired solids. Again, however, practical considerations dictate that the degree of this benefit at some point becomes overshadowed by the disadvantages resulting from the increased amount of liquid utilized in dilution, i.e., increased loads and processing times in the subsequent clarification step to remove insoluble solids and increased liquid removal requirements in the subsequent drying or concentration after solids removal. Our studies have indicated that dilution down to a range of concentrations of from about 5% to about 8% soluble solids by weight is preferable.

The thus diluted extract is then subjected to a clarification procedure designed to remove substantially all of the insoluble components generated during concentration. The nature of these insoluble components has, in our experience, generally required the use of efficient solid-liquid separation apparatus such as a centrifuge. However, other forms of clarification, such as the use of filtration with filter aids, afford a useful degree of insolubles removal.

The extract which has been clarified is typically processed, by concentration and drying, to a soluble tea powder according to known methods, although both the diluted clarified extract and more highly concentrated extracts formed therefrom are per se useful in preparing tea beverages, upon reconstitution in warm or hot water, substantially free of undesired cloudiness.

In processing the diluted, clarified extract to form a stable powder, the extract is generally concentrated (although drying from the dilute extract is possible) in order to decrease the water removal loads on the less energy-efficient drying equipment. The extract is thus typically concentrated to a soluble solids concentration of from about 35% to about 60% by weight and further processed to a substantially dry, shelf-stable powder by, for example, spray-drying or vacuum belt drying.

The foregoing process may be augmented in a known manner by the removal and subsequent re-addition of desirable volatile flavor and aroma components which might otherwise be lost during one or more of the processing steps.

Although specifically developed in response to problems associated with Georgian S.S.R. tea, the generalized processing sequence of the present invention is applicable to the preparation of reconstitutable tea products derived from any tea source. In particular, the process of the present invention may be practiced in the preparation of hot or warm water reconstitutable tea products wherever problems or difficulties arise in the in-process generation of insoluble components which result in cloudiness or turbidity in the final beverage. Such difficulties may arise either by reason of inherent properties and characteristics found throughout an entire strain or source of tea leaf or by reason of such properties appearing in isolated instances in normally non-troublesome leaf owing to atypical growth, climate, handling or processing conditions. In such instances, the conditions for practicing the present invention set forth above regarding minimums, maximums and optimums of concentration, dilution, etc. may, of course, vary somewhat from one leaf to another.

The generalized process principles of the present invention are also applicable to the preparation of cold-water soluble (reconstitutable) tea products. As noted earlier, such products present unique difficulties in the presence of components which are soluble in warm or hot water but not in cool or cold water, and numerous processes have been proposed for the elimination of these components. In one aspect of the present invention, a typical cold-water soluble tea process can be augmented by the present process. Thus, dilute tea extract obtained by extraction of tea leaf from any source is cooled (for example, to about 40°-50° F.) and treated, e.g. by centrifugation, to remove from the extract materials which are insoluble at such temperatures. These "cold-water insolubles" are then treated in an appropriate manner, for example, through addition of enzymes such as tannase or chemical agents such as sodium hydroxide and/or hydrogen peroxide, to effect solubilization thereof. After a subsequent separation to remove any remaining insolubles, the solubilized solids are then reincorporated into the dilute extract from which they were removed and the combined extract is then concentrated, typically to a solids concentration of from about 20 to 60% by weight. This concentrated extract, be it obtained from Georgian S.S.R. or any other source tea leaf often is cloudy or turbid. According to the present invention, this concentrated extract may, therefore, be diluted, clarified, re-concentrated and dried to produce a cold-water soluble tea powder of acceptable clarity. Alternatively, either the solubilized tea solids stream or the original extract remaining after removal of cold-water insolubles may be separately treated according to this invention should it be apparent that the unacceptable cloudiness is solely or primarily contributed from only one of these sources.

The present process may also be utilized in conjunction with cold-water soluble tea processes wherein chemical or enzymatic solubilizing agents are added to the entire body of dilute extract. After concentration, this extract may then be diluted, clarified, re-concentrated and dried to form a cold-water soluble tea powder.

DETAILED DESCRIPTION OF THE INVENTION

The process of the present invention is described in further detail hereinafter with reference to the preparation of a hot or warm water reconstitutable shelf-stable powder from fermented Georgian S.S.R. tea.

Referring to the Figure, the fermented tea leaves are extracted with a suitable extraction liquid in extraction operation 10. The extraction is designed to remove soluble tea solids from the leaves and may be conducted in accordance with any of the well-known procedures for accomplishing this purpose. An example of such an extraction process is the counter-current contact of tea leaves and water in a series of extraction columns, wherein columns containing tea leaves of increasing degrees of extraction are contacted counter-currently with extraction liquid. Thus, for example, the most extracted (spent) leaves are contacted in a column with hot water and the dilute extract formed thereby is then passed through the next succeeding column, containing, for example, fresh unextracted leaves, and the extract therefrom then processed further in accordance with the process of this invention. In the next cycle, a fresh column of unextracted leaves is placed on stream while the previously fresh column becomes the spent column for admission of hot water. Such a process may, of course, be conducted in a continuous, semi-continuous or batch manner with any number of extraction stages.

Other suitable extraction methods may also be utilized, such as single stage counter-current contact of water and leaves, co- or counter-current extraction in a screw press, and the like.

The temperature of the water utilized in extraction is generally between about 90° C. and 100° C. for operation at atmospheric pressure, and preferably in the range of from about 90° C. to about 100° C. Higher temperatures may, of course, be utilized in a pressurized extraction system. The selection of appropriate temperatures is, in general, a function of the interrelated considerations of extraction of a suitable quantity of soluble solids from the leaf and avoidance of excessive temperatures at which degradation of flavor, color and aroma components occurs, each such consideration being affected by the method of extraction employed.

The dilute extract resulting from the extraction operation will typically contain from about 2% to about 6-8% soluble solids by weight depending upon particular batches of leaf, extraction conditions and extraction methods.

The dilute extract (or a portion thereof) resulting from the extraction may optionally be subjected to fractionation operation 12 wherein volatile aromatic/flavor components are removed therefrom in a suitable apparatus and recovered by condensation. The condensed volatile fraction may then be concentrated for re-addition to the extract at one or more stages of the ensuing process, typically to the concentrated extract just prior to drying.

The extract is then optionally clarified at 14 utilizing a suitable centrifugation or filtration method to remove extraneous objects or solid materials from the tea leaves.

The dilute extract is next subjected to a concentration operation 16 wherein water removal is effected. Apparatus typically employed for this process include multiple effect evaporators, thin-film evaporators, falling film evaporators and the like. The degree to which the extract is concentrated in this particular process is, as discussed earlier typically between about 18% to about 50% soluble solids by weight. Within these degrees of concentration, varying amounts of insoluble components, resulting in cloudiness and turbidity in this and subsequent extracts and beverages, are generated.

The concentrated extract is then diluted at 18 in an appropriate mixing vessel. Although dilution is generally accomplished with addition of water, it is also possible to utilize a dilute tea extract which, because of its origin or treatment, will not result in the generation of insoluble components upon subsequent concentration of the extract diluted therewith. The dilution is preferably conducted in a manner to result in an extract having a soluble solids concentration of from about 3% to about 10% by weight, as earlier discussed.

The diluted extract is then subjected to centrifugal separation or to filtration at 20 at conditions effective to remove from the extract substantially all of the insoluble particles contained therein. The centrifugal separation is preferred, although filtration may be utilized to accomplish the desired removal.

The thus clarified extract is then concentrated at 22 in a suitable apparatus such as those earlier described, in order to form an extract suitable for drying, for example, having from about 30% to about 60% soluble solids by weight. This extract is then dried at 24 in a suitable manner (e.g., spray-dried; vacuum belt dried) to provide a substantially water-free, shelfstable powder which can be reconstituted to beverage strength.

The tea beverages produced in accordance with this invention are substantially free of cloudiness and turbidity and are of acceptable flavor, color and aroma.

The present invention also provides for a sequence of unit operations for preparing reconstitutable products from tea which comprises extraction means for contacting tea leaf and an extraction liquid to provide a dilute tea extract; means for concentrating the extract; means for diluting the concentrated extract; clarifying means for removing insoluble solids from the diluted extract; means for concentrating the diluted, clarified extract; and means for drying the thus concentrated extract to form a shelf-stable tea powder. The particular apparatus arrangement may, of course, be augmented by appropriate means for forming cold-water reconstitutable products, such as means for removing, solubilizing and re-incorporating cold-water insoluble materials.

The process of the present invention is illustrated by the following examples.

EXAMPLE I

Fifty-four (54) pounds of Soviet black tea leaf (Georgian S.S.R. Blended; mean mesh size (calculated), 34.7 (U.S. Standard Sieve); % moisture, 7.5; % caffeine, 2.4; % ash, 6.3) were extracted at a rate of 18 lbs/hr in a six (6) stage counter-current extraction unit over the course of 3 hours with water at an average temperature of about 95° C. at a rate of 216 lbs/hr (water:leaf ratio, approximately 12:1) to produce 548 pounds of extract having a solids concentration of about 3.0% by weight (extraction yield, 30%).

Volatiles were recovered from this extract by flash evaporation, and the volatiles concentrated by distillation.

The extract was then concentrated by evaporation under vacuum (temperature, 50° C.; pressure, 90 mm Hg) in a Kontro "Adjust-O-Film" evaporator (Model 02) for 6 hours to obtain 52 pounds of a concentrated extract containing about 29% soluble solids by weight. This hazy, turbid concentrated extract was then diluted with water (25° C.) to a solids content of about 3.6% by weight and the diluted extract centrifuged at 35° C. in a Centrico centrifuge (Model No. OOH-205) (rate, 0.6 lbs/min.) to remove insolubles.

The thus clarified extract was then concentrated in the Kontro evaporator (temperature 50° C.; pressure 90 mm Hg) to a concentration of about 39% solids by weight. Concentrated volatiles were then added stoichiometrically to the extract and the extract spray-dried (inlet temperature 200° C.; outlet temperature 60° C.) in a Bowen Engineering Laboratory SprayDrier to a powder (% moisture, 6.8). When reconstituted to beverage strength (0.4% solids) in hot water (95° C.), a tea beverage of excellent clarity was obtained.

In control experiments, the same leaf tea spray-dried directly from the originally concentrated extract (and also from the original dilute extract) produced beverages of unacceptable haze and turbidity.

In additional experiments, Soviet leaf tea was processed under identical conditions as above with the exception that the diluted extract was filtered, rather than centrifuged, using Johns-Manville 505 filter aid (extract temperature, approximately 35° C.). After concentration and spray-drying, beverages of acceptable clarity could be prepared.

EXAMPLE II

Clarified extract containing chemically-solubilized tea solids, and an aroma concentrate, were obtained in the normal manner from a leaf tea blend (containing no Georgian S.S.R. tea) having a mean mesh size and moisture, caffeine and ash contents typical of those utilized in commercial instant tea manufacture. The clarified extract had a solids concentration of 6.0% by weight and was divided into three (3) 150 pound portions.

The first extract portion was concentrated by evaporation under vacuum in a Kontro "Adjust-O-Film" evaporator (temperature, 57° C.; pressure, 125 mm Hg) to a soluble solids concentration of about 40% by weight. Aroma concentrate was then added to the concentrate and the mixture spray-dried in a Bowen Laboratory Spray-Drier (inlet temperature, 200° C.; outlet temperature, 38° C.) to produce a cold-water soluble instant tea powder (8.5% moisture).

The second extract portion was cooled to about 5° C. and clarified in a Sharples Super Centrifuge at a rate of about 3 lbs/min. The centrifugate was then concentrated by evaporation to a solids concentration of 46% by weight in the Kontro evaporator (temperature, 57° C.; pressure, 125 mm Hg). Concentrated aroma was added to the concentrated extract and the mixture spray-dried in the Bowen Laboratory Spray-Drier (inlet temperature, 200° C.; outlet temperature, 39° C.) to produce a cold-water soluble instant tea powder (7.9% moisture).

The third extract portion was evaporated under vacuum to a solids concentration of 49% by weight in the Kontro evaporator (temperature, 58° C.; pressure, 125 mm Hg). The concentrated extract was diluted down to a solids concentration of 5.5% by weight by the addition of water. The dilute extract was cooled to 5° C. and clarified in the Sharples Super Centrifuge at a rate of about 3 lbs/min. The centrifugate was then evaporated under vacuum to a solids concentration of 43% by weight in the Kontro evaporator (temperature, 58° C.; pressure, 125 mm Hg). Concentrated aroma was added to the solids concentrate and the mixture spray-dried in the Bowen Laboratory Spray-Drier (inlet temperature, 200° C.; outlet temperature, 46° C.) to produce a cold-water soluble instant tea powder (7.0% moisture).

When reconstituted with cold (5° C.) water to beverage concentration (0.4% w/w), a hazy beverage of unacceptable clarity (as is on occasion obtained in commercial production) was produced by the instant tea powder from the first extract portion. A hazy beverage of marginal acceptance was obtained from the instant tea powder from the second portion, and a brilliantly clear beverage obtained from the instant tea powder from the third extract portion. When the clarity of the cold beverages was measured in a laboratory Hazemeter (Radiometer, Copenhagen, NV), the following values were obtained (lower values indicated clearer beverages):

| INSTANT TEA POWDER | HAZE VALUE ASBC FORMAZIN UNITS |
|---|---|
| First Portion | 800+ |
| Second Portion | 710 |
| Third Portion | 330 |

What is claimed is:

1. A process for preparing a water-soluble tea product from Georgian S.S.R. leaf tea which is capable of being reconstituted in water to produce a clear, non-turbid tea beverage, which comprises:
   (a) contacting Georgian S.S.R. leaf tea with an aqueous medium at a temperature of from about 90° C. to about 100° C. and at about atmospheric pressure to form an aqueous tea extract containing from about 1.5 to 8.0 percent by weight soluble solids;

(b) concentrating the aqueous tea extract by evaporating a portion of the water to generate water-insoluble components therein and form a cloudy tea concentrate containing at least about 18 percent by weight soluble solids;

(c) diluting the cloudy tea concentrate with water to form a reconstituted, cloudy second extract containing the water-insoluble components and no more than about 10 percent by weight soluble solids;

(d) removing the water-insoluble components from the second extract to form a clarified tea solution; and (e) concentrating the clarified tea solution by evaporating a portion of the water therefrom to form a clarified second tea concentrate which can be used as the water soluble tea product.

2. A process according to claim 1, which further comprises:

spray drying the clarified second tea concentrate of step (e) to form a substantially moisture free, shelf stable tea powder capable of being reconstituted in water to produce a tea beverage substantially free of cloudiness.

3. A process according to claim 1, which comprises clarifying the aqueous tea extract of step (a) to remove extraneous solid material before the extract is used in step (b).

4. A process according to claim 1 wherein the cloudy tea concentrate of step (b) contains from about 20 to 50 percent soluble solids by weight; and the clarified second tea concentrate of step (e) contains from about 30 to about 60 percent soluble solids by weight.

5. A process according to claim 1 further comprising removing at least of portion of the volatile aromatics from the aqueous tea extract of step (a) before it is used in step (b).

6. A process according to claim 1 wherein step (d) is accomplished by centrifugation or filtration.

7. A process for preparing without chemical treatment a substantially moisture free, shelf stable tea powder from Georgian S.S.R. leaf tea which is capable of dissolving in water to produce a substantially clear aromatic tea beverage, which comprises:

(a) extracting in a counter current and series manner Georgian S.S.R. leaf tea with water at a temperature of from about 90° C. to about 100° C. at about atmospheric pressure to form an aqueous tea extract containing from about 1.5 to 8.0 percent by weight soluble solids;

(b) filtering the aqueous tea extract to remove extraneous solid material and form a clarified filtrate;

(c) fractionally distilling the filtrate to remove and condense a volatile, aromatic fraction and to produce a remaining residue fraction;

(d) evaporating at least a portion of the water from the residue fraction to generate water-insoluble components therein and form a cloudy tea slurry containing from about 20 to about 50 percent soluble solids by weight;

(e) diluting the cloudy tea slurry with water to form a reconstituted cloudy tea mixture containing the water-insoluble components and from about 3 to about 10 percent by weight soluble solids, said soluble solids being dissolved in the water;

(f) removing the water-insoluble components from the tea mixture by centrifuging or filtering to form a clarified tea solution;

(g) concentrating the clarified tea solution by evaporating a portion of the water therefrom which is sufficient to produce a concentrated tea syrup having a soluble solids content of about 30 to 60 percent by weight;

(h) combining the tea syrup and the volatile aromatic fraction of step (c) to produce an aromatic second syrup; and (i) spray-drying the second syrup to form the tea powder.

* * * * *